(12) United States Patent
Zarbel

(10) Patent No.: US 11,724,702 B2
(45) Date of Patent: Aug. 15, 2023

(54) SYSTEM AND METHOD FOR HAZARDOUS DRIVING PREVENTION

(71) Applicant: DYM SENSE LTD., Tel Aviv-Jaffa (IL)

(72) Inventor: Dor Zarbel, Moshav Balfouria (IL)

(73) Assignee: DYM SENSE LTD., Tel Aviv-Jaffa (IL)

( * ) Notice: Subject to any disclaimer, the term of this patent is extended or adjusted under 35 U.S.C. 154(b) by 0 days.

(21) Appl. No.: 17/258,457

(22) PCT Filed: Jul. 7, 2019

(86) PCT No.: PCT/IL2019/050752
§ 371 (c)(1),
(2) Date: Jan. 7, 2021

(87) PCT Pub. No.: WO2020/012461
PCT Pub. Date: Jan. 16, 2020

(65) Prior Publication Data
US 2021/0269044 A1    Sep. 2, 2021

Related U.S. Application Data

(60) Provisional application No. 62/695,049, filed on Jul. 8, 2018.

(51) Int. Cl.
*B60Q 1/00* (2006.01)
*B60W 40/08* (2012.01)
(Continued)

(52) U.S. Cl.
CPC ............ *B60W 40/08* (2013.01); *B60W 50/14* (2013.01); *G06V 20/597* (2022.01); *B60W 2540/043* (2020.02); *B60W 2540/24* (2013.01)

(58) Field of Classification Search
CPC ................. B60W 40/08; B60W 50/14; B60W 2540/043; B60W 2540/24; G06K 9/00845
(Continued)

(56) References Cited

U.S. PATENT DOCUMENTS

| 6,157,317 A | 12/2000 | Walker |
| 6,504,614 B1 | 1/2003 | Messerschmidet et al. |

(Continued)

FOREIGN PATENT DOCUMENTS

| CN | 203142402 | 8/2013 |
| CN | 107031653 B | 3/2018 |

OTHER PUBLICATIONS

Search Report of International Application No. PCT/IL2019/050752 dated Oct. 10, 2019.

*Primary Examiner* — Naomi J Small
(74) *Attorney, Agent, or Firm* — Pearl Cohen Zedek Latzer Baratz LLP

(57) ABSTRACT

A system for preventing an unauthorized and/or hazardous use of a vehicle. The system may include a first sensor; a driver recognition module in communication with the first sensor, the driver recognition module is configured to determine an identity of a driver based on readings of the first sensor; a second sensor; a driver condition determination module in communication with the second sensor, the driver condition determination module is configured to determine a condition of the driver based on readings of the second sensor; and a hazardous driving prevention module in communication with the driver recognition module and driver condition determination, the hazardous driving prevention module is configured to determine and perform one or more actions of a predetermined set of actions based on the determined identity and determined condition of the driver.

11 Claims, 2 Drawing Sheets

(51) Int. Cl.
B60W 50/14 (2020.01)
G06V 20/59 (2022.01)

(58) Field of Classification Search
USPC .......................................................... 340/439
See application file for complete search history.

(56) References Cited

U.S. PATENT DOCUMENTS

| | | | |
|---|---|---|---|
| 6,654,125 B2 | 11/2003 | Maynard et al. | |
| 7,016,713 B2 | 3/2006 | Gardner et al. | |
| 7,403,804 B2 | 7/2008 | Ridder et al. | |
| 7,451,852 B2 * | 11/2008 | Stewart | B60K 28/063 340/576 |
| 8,515,506 B2 | 8/2013 | Ridder et al. | |
| 8,781,544 B2 | 7/2014 | Al-Ali et al. | |
| 9,475,387 B2 | 10/2016 | Wu | |
| 10,099,554 B2 | 10/2018 | Steeg et al. | |
| 2004/0239510 A1 | 12/2004 | Karsten | |
| 2006/0212195 A1 | 9/2006 | Veith et al. | |
| 2010/0108425 A1 * | 5/2010 | Crespo | B60K 28/063 180/272 |
| 2012/0075094 A1 * | 3/2012 | Keays | G01N 33/4972 340/539.12 |
| 2012/0242469 A1 * | 9/2012 | Morgan | B60K 28/063 340/426.11 |
| 2013/0169442 A1 * | 7/2013 | Ruocco | B60K 28/063 340/576 |
| 2014/0359722 A1 * | 12/2014 | Schultz | H04L 63/0861 726/5 |
| 2016/0171546 A1 * | 6/2016 | Gartenberg | G06Q 30/0261 705/14.58 |
| 2017/0096145 A1 | 4/2017 | Bahn | |
| 2017/0263120 A1 * | 9/2017 | Durie, Jr. | G08G 1/205 |

* cited by examiner

SYSTEM AND METHOD FOR HAZARDOUS DRIVING PREVENTION

CROSS-REFERENCE TO RELATED APPLICATIONS

This application is a National Phase Application of PCT International Patent Application No. PCT/IL2019/050752, International Filing Date Jul. 7, 2019, entitled System and Method for Hazardous Driving Prevention, published on Jan. 16, 2020 as PCT International Patent Application Publication No. WO 2020/012461, claiming the benefit of U.S. Provisional Patent Application No. 62/695,049, filed Jul. 8, 2018, which is hereby incorporated by reference.

FIELD OF THE INVENTION

The present invention relates to the field of safe driving systems, and more particularly, to systems for preventing of an unfit driver from driving a vehicle.

BACKGROUND OF THE INVENTION

Current safe driving systems are typically limited to account for no more than few parameters of a driver when considering whether the driver is in a condition to use a vehicle. There is along felt need for a system that uses multiple factors to deter driving by an unfit driver.

SUMMARY OF THE INVENTION

One aspect of the present invention provides a system for preventing an unauthorized and/or hazardous use of a vehicle, the system may include: a first sensor; a driver recognition module in communication with the first sensor, the driver recognition module is configured to determine an identity of a driver based on readings of the first sensor; a second sensor; a driver condition determination module in communication with the second sensor, the driver condition determination module is configured to determine a condition of the driver based on readings of the second sensor; and a hazardous driving prevention module in communication with the driver recognition module and driver condition determination, the hazardous driving prevention module is configured to determine and perform one or more actions of a predetermined set of actions based on the determined identity of the driver, the determined condition of the driver and a predetermined set of rules; wherein the predetermined set of actions includes at least one of: allowing the driver to use the vehicle, allowing the driver to use the vehicle under certain restrictions, and warning at least one of the driver, passengers and a third party concerning the determined condition of the driver.

In some embodiments, the first sensor is selected from a group consisting of: fingerprint recognition sensor, face recognition sensor and voice recognition sensor.

In some embodiments, the second sensor is selected from a group consisting of: sensor for measuring levels of legal drugs, sensor for measuring levels of illegal drugs, sensors for measuring levels of hormones.

In some embodiments, the first sensor and the second sensor are operationally linked such that the identity of the driver is determined together with the condition of the driver to make sure that the identity and the condition are being determined for the same driver.

In some embodiments, the hazardous driving prevention module is configured to: classify the driver based on the determined identity of the driver to yield a classification of the driver; and determine and perform the one or more actions based on the determined condition of the driver and further based on the classification of the driver.

In some embodiments, the hazardous driving prevention module is configured to reidentify the driver to ensure that the driver who is driving a vehicle is the driver that is allowed to drive.

In some embodiments, the system includes a self-testing module in communication with the driver condition determination module and the hazardous driving prevention module, the self-testing module is configured to enable the driver to perform a self-test using the driver condition determination module and the hazardous driving prevention module without saving a self-test result in a log of the system.

Another aspect of the present invention may provide a method of preventing an unauthorized and/or hazardous use of a vehicle, the method may include: determining an identity of a driver based on readings of a first sensor; determining a condition of the driver based on readings of a second sensor; and determining and performing one or more actions of a predetermined set of actions based on the determined identity of the driver, the determined condition of the driver and a predetermined set of rules, wherein the predetermined set of actions includes at least one of: allowing the driver to use the vehicle, allowing the driver to use the vehicle under certain restrictions, and warning at least one of the driver, passengers and a third party concerning the determined condition of the driver.

In some embodiments, the method may further include: classifying the driver based on the determined identity of the driver to yield a classification of the driver; and determining and perform the one or more actions based on the determined condition of the driver and further based on the classification of the driver.

In some embodiments, the method may further include reidentifying the driver to ensure that the driver who is driving a vehicle is the driver that is allowed to drive.

In some embodiments, the method may further include enabling the driver to perform a self-test without saving a self-test result in a log of the system.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1:
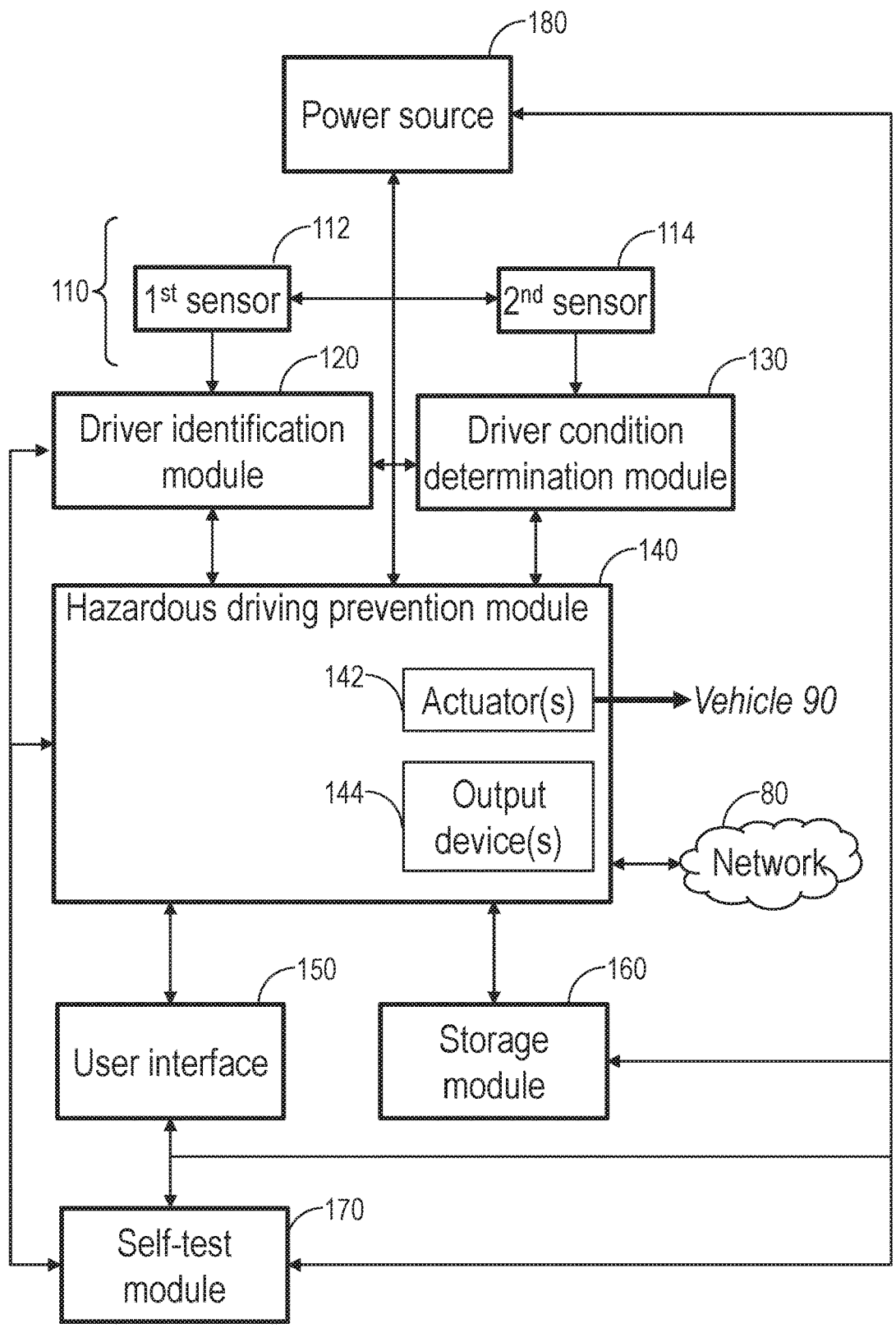
FIG. 1 is a schematic block diagram of a system for preventing an unauthorized and/or hazardous use of a vehicle, according to some embodiments of the invention.

It will be appreciated that, for simplicity and clarity of illustration, elements shown in the figures have not necessarily been drawn to scale. For example, the dimensions of some of the elements may be exaggerated relative to other

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Some aspects of the present invention may provide a system for preventing an unauthorized and/or hazardous use of a vehicle. In some embodiments, the system may use sensors and/or other information sources to identify the driver and/or to determine a condition of the driver before a vehicle is operated. In some embodiments, the system may allow for multiple levels and/or forms of control of driver behavior. For example, the system may discourage and/or prevent operation of the vehicle according to a level of hazard. In some embodiments, the system may account for possible errors in measurements, personal factors of the driver, external conditions (e.g., time, weather, and/or location), etc. For example, under some conditions the system may take action to prevent use of the vehicle. In some embodiments, the system may alert a third party of the driver's situation. In some embodiments, the system may alert the driver and/or passengers of the conditions and/or offer options and/or suggestions.

In various embodiments, the system may identify a vehicle driver before operation of the vehicle, during operation of the vehicle and/or after operation of the vehicle. For example, the system may prevent an authorized driver from initiating a trip and then passing the vehicle to an unauthorized driver. For example, the system may prevent parking and/or switching off a vehicle by a driver who was not approved at the beginning of a trip.

In some embodiments, the system may allow a personalized control and/or oversight of the users of a vehicle. For example, the system may include many customizable options regarding the condition of a driver, identities of a driver and/or consequences of actions of a driver of a vehicle. The system may allow personalized control of access of drivers to a vehicle accounting for, for example, the identity of the driver, the condition of the driver, external conditions etc. For example, the system may facilitate control of the use of a vehicle by a legal authority, a guardian of a driver and/or a vehicle owner.

Reference is now made to FIG. 1, which is a schematic block diagram of a system 100 for preventing an unauthorized and/or hazardous use of a vehicle, according to some embodiments of the invention.

According to some embodiments, system 100 may include one or more sensor(s) 110, a driver identification module 120, a driver condition determination module 130, a hazardous driving prevention module 140, a user interface 150, a storage module 160 and a power source 170.

According to some embodiments, sensor(s) 110 may be in communication with driver identification module 120 and driver condition determination module 130.

Driver identification module 120 may receive readings of sensor(s) 110 and determine an identity of a potential driver of a vehicle based on the readings thereof. Driver condition determination module 130 may include may receive readings of sensor(s) 110 and determine a condition of the potential driver based on the readings thereof.

In some embodiments, system 100 may include different sensor(s) for identifying the driver and different sensor(s) for determining the condition of the driver. For example, system 100 may include one or more first sensors 112 for identifying the driver and one or more sensors 114 for determining the condition of the driver. First sensor(s) 112 may, for example, be sensor(s) for fingerprint recognition, face recognition, voice recognition, etc. Second sensor(s) 114 may, for example, be sensor(s) for measuring levels of legal drugs (e.g., alcohol and/or prescription drugs and/or pain killers) and/or illegal drugs (e.g., cannabis and/or cocaine), levels of hormones (e.g., signs that a driver is angry or tired) and/or other signs that a person is not fit to drive.

First sensor(s) 112 may be in communication with driver identification module 120 and second sensor(s) 114 may be in communication with driver condition determination module 130. The communication between sensor(s) 110 and identification module 120 and driver condition determination module 130 may be wired or wireless. For example, first sensor(s) 112 used to identify the driver may be required to connect to driver identification module 120 by a local connection and/or a hardwired connection (so that it is clear that the driver who is identifying himself is actually present). In another example, first sensor(s) used to identify the driver may be connected to a device that is required to operate the vehicle (e.g., a key, ignition switch/button, steering wheel, gear stick, etc.). The selection of the device may be according to user's preferences.

In some embodiments, first sensor(s) 112 and second sensor(s) 114 may be operationally linked. For example, a fingerprint sensor used for identifying the driver (e.g., first sensor 112) may be connected to a blood alcohol sensor (e.g., second sensor 114) used for determining driver's blood alcohol concentration (e.g., the driver condition). In this manner, the identity of the driver may be determined together with the condition of the driver to make sure that the approved driver is the one who, for example, tested negative to blood alcohol and/or drug content.

In various embodiments, first sensor(s) 112 and/or second sensor(s) 114 are non-invasive sensors. In various embodiments, first sensor(s) 112 and/or second sensor(s) 114 are not breathalyzers (e.g., are not sensors configured to analyze a breath sample).

Hazardous driving prevention module 140 may be in communication with driver identification module 120 and driver condition determination module 130. Hazardous driving prevention module 140 may determine and perform one or more actions of a plurality of actions based on the determined identity of the protentional driver, determined condition of the protentional driver and a predetermined set of rules. For example, for an unauthorized driver and/or a driver where there is reliable data that the driver is significantly debilitated, hazardous driving prevention module 140 may activate a locking device to prevent access to the vehicle. For example, for a less clear case, hazardous driving prevention module 130 may send a message informing a third party of the situation (for example the message may be sent over a network). For another case, for example where the driver is authorized but may be borderline debilitated, hazardous driving prevention module 140 may issue a warning to the driver and/or passengers and/or may note that the driver drove under questionable conditions (for example on an internal memory and/or in a message over network) but may allow the driver to continue his trip. Combinations of the above actions may also be made.

In some embodiments, hazardous driving prevention module 140 may classify the potential driver according to driver's identity determined by driver identification module 110. For example, some drivers may be unauthorized to drive under any conditions. Some drivers may be authorized to drive only under certain conditions (for example in the presence of an authorized escort, in an emergency situation and/or when special permission is issued). Some drivers may be allowed to drive in certain areas and/or under certain conditions (at certain times, under good weather etc.). Some drivers may be permitted to drive under more general conditions. Some drivers may not be given the benefit of the doubt (for example if there is a question of whether the driver is fit to drive, he may be prevented from driving for example by locking the ignition and/or fuel pump of the vehicle). Some drivers may be given the benefit of the doubt (for example if there is a question of whether the driver is fit to drive, he may be free to drive and/or the system will not prevent him from driving). Some drivers may be given limited benefit of the doubt (for example if there is a question of whether the driver is fit to drive he may be discouraged from driving, e.g., by warning him and/or by recording his condition and/or by sending a message to third party, but will not be prevented from driving). For some conditions, even a preferred user may be prevented from driving (e.g., if one and/or multiple sensors indicate a high level of debilitation and/or debilitation at a high level of reliability and/or an illegal condition for example an illegally high blood alcohol). Combinations of the above actions may also be made. For example a certain driver may be given the benefit of the doubt in certain places and/or times and not in others and/or for certain senor results and/or not others and/or some users may be required to take more tests than others and/or take tests more often than others.

According to various embodiments, hazardous driving prevention module 140 may include one or more actuators 142 and/or one or more output devices 144. Actuator(s) 142 and/or output device(s) 144 may be in communication with hazardous driving prevention module 140 that may be configured to control actuator(s) 142 and/or output device(s) 144. For example, actuator(s) 142 may be in communication with vehicles systems (e.g., a vehicle processor) and may be used by hazardous driving prevention module 140 to prevent unauthorized use of the vehicle (either completely preventing use and/or limiting use for example by not allowing acceleration over a certain speed). In another example, output devices 144 may be used by hazardous driving prevention module 140 to warn a driver, a passenger and/or a third party of various hazardous conditions and/or behaviors.

According to some embodiments, system 100 may include a user interface 150. Hazardous driving prevention module 140 may be connected to a user interface 150 to, for example, allow a user (for example a supervisor of the fleet of vehicles and/or a parent and/or a vehicle owner) to adjust system 100 by, for example, changing how a driver is characterized by driver identification module 120 and/or by driver condition determination module 130 (e.g., based on readings of sensor(s) 110).

According to some embodiments, system 100 may include a storage module 160 (e.g., a computer readable memory). Storage module 160 may be in communication with driver identification module 120, driver condition determination module 130 and hazardous driving prevention module 140.

In some embodiments, storage module 160 may store readings from sensor(s) 110 (e.g., sensor(s) outputs). In some embodiments, storage module 160 may store data concerning identities of users of system 100 (e.g., fingerprints and/or facial data on authorized drivers).

In some embodiments, storage module 160 may include policies. The policies may, for example, include thresholds for sensor levels under which a driver will be allowed to drive, will be limited, will be warned etc. In some embodiments, the policies may be updated. For example, a supervisor may be able to change policies permanently and/or temporarily (for example if an authorized driver tests as debilitated, a non-authorized driver may be given temporary approval to drive (for example to return the authorized driver home)). Temporary approval may be conditioned (for example permission may only be for one trip to the home of the authorized driver). For example, some supervisors may keep strict policies and avoid dangerous conditions (for example alcohol levels) even when they are borderline and/or within the legal limits. In another example, some supervisors may keep policies that are less strict without interfering except in cases where there is a high probability of illegal behavior (e.g. driving over the legal alcohol limits).

In some embodiments, storage module 160 may store trip information. The trip information may, for example, include speed, location, time etc.

In various embodiments, storage module 160 may store a log with details of trips and/or drivers. For example, the log may include vehicle identification, the times and/or locations of the vehicle, speeds, driver identities, driver states (for example sensor outputs). For example, the log may be used by insurance to decide risk and/or rates. For example, the log may be used to derive driving statistics and/or improve policies to reduce accidents. In some embodiments, the log may be collected by legal agencies, especially for example in the case of public vehicles (e.g., buses) and/or commercial vehicles (e.g., trucks and/or cabs) and/or vehicles carrying hazardous cargos. For example, the log may be used in case of an accident to determine indemnity. For example, the log may be stored on a local memory and/or a remote memory.

In various embodiments, at least some data/information stored in storage module 160 may be protected. For example, a driver may not have the access to change the contents of the memory.

According to some embodiments, hazardous driving prevention module 140 may be in communication with an external network 90. Hazardous driving prevention module 140 may receive data/information from an external network (e.g., road information, geolocation data, etc.).

According to various embodiments, hazardous driving prevention module 140 may use a sensor and/or network connection of a driver's cell phone and/or a processor and/or a battery and/or a memory of the driver's cell phone. For example, the cell phone may include an application that coordinates connection to system 100.

According to some embodiments, hazardous driving prevention module 140 may include a dedicated wireless transceiver for example to a cellular network. hazardous driving prevention module 140 may connect to a network via an external device. For example, hazardous driving prevention module 140 may use a personal computing device (e.g., a cellphone for external communications). For example, an authorized driver may be required to connect the driver's cell phone to the system before and/or during driving. For example, system 100 may include a hard-wired cell-phone dock. hazardous driving prevention module 140 may connect to a cell phone via a wireless connection (e.g., Bluetooth). In another example, an addition optional safety feature of system 100 may include that the cell phone of the driver may be required to be docked and/or the screen off and/or not sensitive to touch while the user is driving. For example, the system may use various consequences (e.g., preventing driving, notifying a third party, warning buzzers, etc.) unless the cell phone is docked and/or reports that its screen is off. In some embodiments, the at least some modules of system 100 may receive software updates and/or user support over a network connection.

According to some embodiments hazardous driving prevention module 140 may send information, receive information, send requests for action and/or receive instruction from a third party. For example, a third party may include a vehicle owner and/or supervisor. For example, in the case of a company vehicle and/or a rented vehicle, the supervisor may include the vehicle owner. For example, in the case of a family vehicle the third party may include the head of the household, a parent and/or a spouse. In some embodiments, the third party may include an authority, for example the police and/or an emergency responder. Optionally, the third party may include an insurer. For example, the insurance company may agree to lower insurance costs for clients who agree to installation of the system and/or that the insurance company receives the data. For example, the information sent to a third party may include the times and locations of the vehicle, speeds, driver identities, driver states (for example sensor outputs and/or debility levels).

According to some embodiments, hazardous driving prevention module 140 may be connected to driver information systems of a vehicle. For example, when a driver appears to be debilitated, warning lights of the vehicle and/or a sound system of the vehicle may be used to tell the driver and/or the passengers that driving now is not recommended. For example, a seat belt warning light and/or buzzer and/or the like may be used to discourage driving under the influence of drugs and/or alcohol.

According to some embodiments, hazardous driving prevention module 140 may present to a user options to avoid driving using. For example, the options may be presented orally (over the speakers of the vehicle and/or over a cellphone) and/or as a message (e.g., a message sent over a cell network messenger service (e.g., SMS, Whatsapp, etc.) and/or as a notification (presented for example on a screen of the vehicle and/or a PCD). For example, alternative transportation sources may include options for commercial transport e.g. a recommendation for taxis and buses relevant to the location and time desired. In some embodiments, hazardous driving prevention module 140 may post the location on a network with a request for transportation and/or help from other nearby drivers. For example, the network may include a closed network, for example members of the driver's associates and/or people associated with vehicle owner. In some embodiments, the request may be sent over a public network for example, a ride sharing network and/or a traffic safety network arranging rides for stranded and/or debilitated drivers. In some embodiments, hazardous driving prevention module 140 may call for help from a public or private service, for example a towing service, police, ambulance, etc.

According to some embodiments, hazardous driving prevention module 140 may ensure that the driver who is driving a vehicle is really the driver that was approved at the beginning of a trip. For example, after approving a user to drive, the hazardous driving prevention module 140 may require the user to confirm his identity using sensor(s) 110 (e.g., using first sensor 112) and driver identification module 120. For example, during a trip and/or after a trip hazardous driving prevention module 140 may require that an authorized driver confirm his identity. If the authorized driver is not in the vicinity of the vehicle and/or does not identify himself to a local sensor, the system may take action.

In some embodiments, when an approved driver fails to identify himself during a trip, hazardous driving prevention module 140 may give a warning and/or may give a limited time to park the vehicle and turn it off. In some embodiments, hazardous driving prevention module 140 may prevent the user from stowing the vehicle (for example by preventing him from turning the vehicle off and/or from turning of the emergency blinkers) until the approved driver identifies himself and/or the system may inform a third party when an approved driver failed to reidentify himself before a vehicle was turned off. In some embodiments, certain functions of the vehicle may require reidentification of the approved driver. For example, when an approved driver is not present and/or was not present when the vehicle is turned off, a gas cap may be locked, preventing refueling until corrective action is taken. In some embodiments, if a vehicle was turned off without the approved driver reidentifying himself, the approved driver may be prevented from using the vehicle again and/or may be prevented from used any vehicle in a fleet until corrective action is taken. In some embodiments, if a vehicle was turned off without the approved driver reidentifying himself, the vehicle may be locked to prevent one or more drivers from using the vehicle until corrective action is taken. For example, requirements for the driver to identify himself may be set at time when it is not dangerous for the driver reidentify himself, for example while the vehicle is stopped.

In various embodiments, hazardous driving prevention module 140 may require the driver to identify himself by means of a password and/or by means of first sensor(s) 112. For example, first sensor(s) 112 may include a fingerprint detector and/or by face recognition and/or voice recognition. First sensor(s) 112 may be on an external device and/or hazardous driving prevention module 140 may wait for confirmation over a local network (e.g. Bluetooth from the driver's cell phone) that he has identified himself. In some embodiments, first sensor(s) 112 may be mounted in the vehicle. In some embodiments, other sensors may be used to identify a driver and/or discern a change in his behavior that may imply debilitation. For example, hazardous driving prevention module 140 may receive data from and/or be attached to vehicle sensors (for example a speedometer and/or an accelerometer of an airbag) and/or an external sensor such as a driver's assistance sensor (e.g., MobileEye) and/or a cell phone sensor (e.g., a fingerprint reader, a camera and/or facial recognition software, an IR detector, a microphone and/or voice recognition software etc.). In some embodiments, any of the above-mentioned sensors may be a dedicated sensor mounted in the vehicle or mounted on another device.

According to some embodiments, hazardous driving prevention module 140 may monitor the behavior of the driver and/or the vehicle and use the data to discern changes that may imply that the driver is not the person who was approved and/or that the driver is debilitated. Optionally, hazardous driving prevention module 140 may use artificial intelligence to interpret data. In this manner, requiring the driver to reidentify himself may discourage a non-approved user to drive based on approval for another driver. Optionally, the data will be used to determine other factors for example about vehicle performance.

According to some embodiments, system 100 may include a self-test module 170. In some embodiments, a user may be enable to use at least some of modules of system 100 "off the record". For example, a user may test himself, for example to determine his alcohol level. Self-test module 170 may be configured to use sensor(s) 110 and/or hazardous driving prevention module 140 without reporting to a third party and/or storing results in storage module 160. Optionally self-test module 170 may give useful information such as "how much more can I drink before going over the permissible alcohol level", "how long must I wait until my blood alcohol will return to an acceptable level", etc. In some embodiments, self-test module 170 may allow a user to make such a determination (possible with low accuracy or reliability) with a cell phone sensor (for example an infrared detector). In some embodiments, the user will use a sensor mounted to a car for off the record measurements. In some embodiments, sensor(s) 110 of system 100 may be portable. For example, a blood level sensor and/or wireless data transmitter may be mounted on a vehicle key. For example, the user may be able to take the key with him to and receive results on his cell phone results of blood alcohol tests for himself and/or his associates. Optionally, self-test module 180 will require that the key and/or sensor be close to the car when a potential driver is identified and/or tested for debilitation.

According to some embodiments, system 100 may include a power source 180. In some embodiments, power source 180 may be connected to sensor(s) 110, driver identification module 120, driver condition determination module 130, hazardous driving prevention module 140, user interface 150, storage module 160 and self-testing module 170 and adapted to provide power thereto. In other embodiments, at least some modules of system 100 may receive power from the battery of the vehicle and/or have a dedicated battery.

According to various embodiments, each of modules of system 100 (e.g., driver identification module 120, driver condition determination module 130, hazardous driving prevention module 140, storage module 160, self-testing module 170) may be implemented on its own computing device, a single (e.g., shared) computing device, a personal computing device (e.g., cell phone) of the driver, a cloud, or a combination of computing devices.

According to some embodiments, system 100 may be retrofitted to be used with existing vehicles. The flexible rules of system 100 may make it suitable for use with a range of simple sensors and/or available sensors. For example, the flexible decision-making process may make it possible to achieve an effective system with sensor that are not themselves highly reliable. Optionally this facilitates fitting system 100 into existing and/or low value vehicles without expensive installation and/or expensive high accuracy sensors. For example, checking the driver at various stages and/or the end of a trip may make it possible to avoid drivers fooling the system (one person passing a test and then letting another drive) without requiring expensive and/or obtrusive sensors that are hard installed to the car and identify the driver during a trip.

Figure 2:
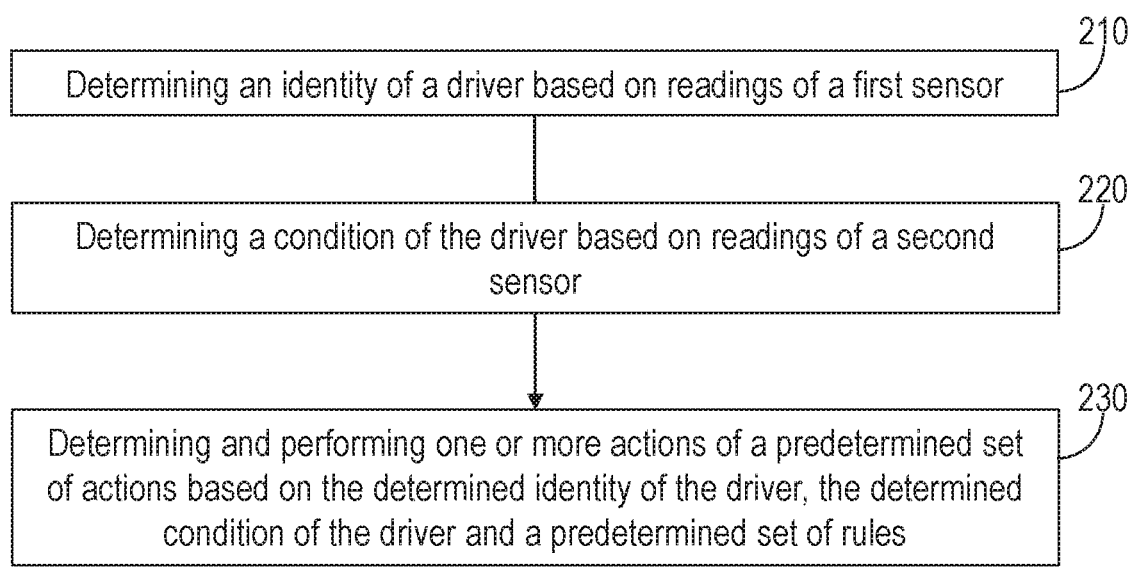
FIG. 2 is a flowchart of a method of preventing an unauthorized and/or hazardous use of a vehicle, according to some embodiments of the inventio.

Reference is now made to FIG. 2, which is a flowchart of a method 200 of preventing an unauthorized and/or hazardous use of a vehicle, according to some embodiments of the invention.

Method 200 may be implemented by system 100, which may be configured to implement method 200. It is noted that method 200 is not limited to the flowcharts illustrated in FIG. 2 and to the corresponding description. For example, in various embodiments, method 200 needs not move through each illustrated box or stage, or in exactly the same order as illustrated and described.

According to some embodiments, method 200 may include determining an identity of a driver based on readings of a first sensor (stage 210). For example, the first sensor may be similar to first sensor(s) 112 described above with respect to FIG. 1. The identity of the driver may be determined using, for example, driver identity determination module 120 as described above with respect to FIG. 1.

According to some embodiments, method 200 may include determining a condition of the driver based on readings of a second sensor (stage 220). For example, the second sensor may be similar to second sensor(s) 114 described above with respect to FIG. 1. The condition of the driver may be determined using, for example, driver condition determination module 130 as described above with respect to FIG. 1.

According to some embodiments, method 200 may determining and performing one or more actions of a predetermined set of actions based on the determined identity of the driver, the determined condition of the driver and a predetermined set of rules (stage 230). For example, the determining and performing of the one or more actions may be utilized using hazardous driving prevention module 140 as described above with respect to FIG. 1.

In some embodiments, the predetermined set of actions may include at least one of: allowing the driver to use the vehicle, allowing the driver to use the vehicle under certain restrictions, and warning at least one of the driver, passengers and a third party concerning the determined condition of the driver (e.g., as described above with respect to FIG. 1).

In some embodiments, method 200 may include classifying the driver based on the determined identity of the driver to yield a classification of the driver; and determining and perform the one or more actions based on the determined condition of the driver and further based on the classification of the driver (e.g., by hazardous driving prevention module 140 as described above with respect to FIG. 1 as described above with respect to FIG. 1).

In some embodiments, method 200 may include reidentifying the driver to ensure that the driver who is driving a vehicle is the driver that is allowed to drive (e.g., by hazardous driving prevention module 140, driver identity determination module 120 and using first sensor(s) 112 as described above with respect to FIG. 1).

In some embodiments, method 200 may include enabling the driver to perform a self-test without saving a self-test result in a log of the system (e.g., using self-test module 180 as described above with respect to FIG. 1).

Advantageously, the disclosed system and method may provide an objective and real-time determination of a driver's condition by measuring various physiological parameters of the driver (e.g., alcohol levels, drugs levels, hormones, etc.) and an objective real-time determination whether the driver is capable to safely operate the vehicle.

The disclosed system and method may be also implemented in various additional fields, such as medicine (e.g., to determine the physician's condition), construction industry, legal industry, etc. Optionally, the system and method may be implemented in emergency departments in hospitals to, for example, determine a patient's condition, etc.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be vehicleried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for preventing an unauthorized and/or hazardous use of a vehicle, the system comprising:
   a first sensor;
   a driver recognition module in communication with the first sensor, the driver recognition module is configured to determine an identity of a driver based on readings of the first sensor;
   a second sensor;
   a driver condition determination module in communication with the second sensor, the driver condition determination module is configured to determine a condition of the driver based on readings of the second sensor, wherein the second sensor is configured to measure a hormone level of the driver;
   a cell phone dock configured to receive a cell phone of the driver; and
   a hazardous driving prevention module in communication with the driver recognition module, driver condition determination module, the hazardous driving prevention module is configured to determine and perform one or more actions of a predetermined set of actions based on the determined identity of the driver, the determined condition of the driver, the docking status of the cell phone of the driver, and a predetermined set of rules;
   wherein the predetermined set of actions comprises at least one of:
   allowing the driver to use the vehicle,
   allowing the driver to use the vehicle under certain restrictions, and
   warning at least one of the driver, passengers and a third party concerning the determined condition of the driver.

2. The system of claim 1, wherein the first sensor is selected from a group consisting of: fingerprint recognition sensor, face recognition sensor and voice recognition sensor.

3. The system of claim 1, wherein the second sensor is selected from a group consisting of: sensor for measuring levels of legal drugs, sensor for measuring levels of illegal drugs.

4. The system of claim 1, wherein the first sensor and the second sensor are operationally linked such that the identity of the driver is determined together with the condition of the driver to make sure that the identity and the condition are being determined for the same driver.

5. The system of claim 1, wherein the hazardous driving prevention module is configured to: classify the driver based on the determined identity of the driver to yield a classification of the driver; and determine and perform the one or more actions based on the determined condition of the driver and further based on the classification of the driver.

6. The system of claim 1, wherein the hazardous driving prevention module is configured to reidentify the driver to ensure that the driver who is driving a vehicle is the driver that is allowed to drive.

7. The system of claim 1, further comprising a self-testing module in communication with the driver condition determination module and the hazardous driving prevention module, the self-testing module is configured to enable the driver to perform a self-test using the driver condition determination module and the hazardous driving prevention module without saving a self-test result in a log of the system.

8. A method of preventing an unauthorized and/or hazardous use of a vehicle, the method comprising:
   determining an identity of a driver based on readings of a first sensor;
   determining a condition of the driver based on readings of a second sensor, wherein the readings of the second sensor comprise a hormone level of the driver; and
   determining and performing one or more actions of a predetermined set of actions based on the determined identity of the driver, the determined condition of the driver, a docking status of a cell phone of the driver, and a predetermined set of rules, wherein the predetermined set of actions comprises at least one of:
   allowing the driver to use the vehicle,
   allowing the driver to use the vehicle under certain restrictions, and
   warning at least one of the driver, passengers and a third party concerning the determined condition of the driver.

9. The method of claim 8, further comprising:
   classifying the driver based on the determined identity of the driver to yield a classification of the driver; and
   determining and perform the one or more actions based on the determined condition of the driver and further based on the classification of the driver.

10. The method of claim 8, further comprising reidentifying the driver to ensure that the driver who is driving a vehicle is the driver that is allowed to drive.

11. The method of claim 8, further comprising enabling the driver to perform a self-test without saving a self-test result in a log of the system.

* * * * *